US010474604B2

(12) United States Patent
Rozic et al.

(10) Patent No.: US 10,474,604 B2
(45) Date of Patent: Nov. 12, 2019

(54) TRANSMITTING UNIVERSAL SERIAL BUS (USB) DATA OVER ALTERNATE MODE CONNECTION

(71) Applicant: INTEL CORPORATION, Santa Clara, CA (US)

(72) Inventors: Reuven Rozic, Binyamina (IL); Karthi R. Vadivelu, Folsom, CA (US); Raul Gutierrez, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 219 days.

(21) Appl. No.: 15/088,997

(22) Filed: Apr. 1, 2016

(65) Prior Publication Data
US 2017/0286343 A1 Oct. 5, 2017

(51) Int. Cl.
G06F 13/38 (2006.01)
G06F 13/40 (2006.01)
G06F 13/42 (2006.01)

(52) U.S. Cl.
CPC ........ *G06F 13/385* (2013.01); *G06F 13/4022* (2013.01); *G06F 13/4282* (2013.01); *G06F 2213/0024* (2013.01); *G06F 2213/0042* (2013.01)

(58) Field of Classification Search
CPC .............. G06F 13/385; G06F 13/4022; G06F 13/4282; G06F 2213/0024; G06F 2213/0042
See application file for complete search history.

(56) References Cited

U.S. PATENT DOCUMENTS

| 6,622,178 | B1* | 9/2003 | Burke | G06F 1/3209 |
| | | | | 710/109 |
| 6,704,310 | B1* | 3/2004 | Zimmermann | H04L 12/6418 |
| | | | | 348/207.1 |
| 9,071,460 | B1* | 6/2015 | Zohner | H04L 12/5601 |
| 2005/0027889 | A1* | 2/2005 | Sandulescu | G06F 13/4045 |
| | | | | 709/250 |
| 2007/0253447 | A1* | 11/2007 | Jiang | H04L 1/0083 |
| | | | | 370/474 |
| 2008/0028113 | A1 | 1/2008 | Guo et al. | |
| 2009/0164694 | A1* | 6/2009 | Talayco | G06F 13/4022 |
| | | | | 710/316 |
| 2009/0248978 | A1* | 10/2009 | Solomon | G06F 13/4282 |
| | | | | 711/114 |
| 2010/0185792 | A1* | 7/2010 | Yao | G06F 13/4027 |
| | | | | 710/33 |

(Continued)

OTHER PUBLICATIONS

PCT International Search Report, PCT Application No. PCT/US2017/015031, dated May 8, 2017, 3 pages.

(Continued)

*Primary Examiner* — Eric T Oberly
(74) *Attorney, Agent, or Firm* — International IP Law Group, P.L.L.C.

(57) ABSTRACT

An example includes an apparatus for transmitting Universal Serial Bus (USB) packets. The apparatus includes a transmitter adapter to receive a USB packet from a USB device. The transmitter adapter can further generate one or more alternate mode packets based on the USB packet. The transmitter adapter can also transmit the alternate mode packets via an alternate mode connection.

23 Claims, 7 Drawing Sheets

(56) References Cited

U.S. PATENT DOCUMENTS

| | | | |
|---|---|---|---|
| 2010/0318697 A1* | 12/2010 | Siulinski | H04L 12/2803 |
| | | | 710/70 |
| 2011/0087805 A1 | 4/2011 | Liu et al. | |
| 2012/0307842 A1 | 12/2012 | Petrov et al. | |
| 2013/0055044 A1 | 2/2013 | Eljezovic et al. | |
| 2013/0205053 A1* | 8/2013 | Harriman | G06F 13/4022 |
| | | | 710/105 |
| 2013/0262708 A1* | 10/2013 | McLeod | G06F 13/4252 |
| | | | 710/2 |
| 2015/0193372 A1* | 7/2015 | Norair | H01Q 1/084 |
| | | | 710/63 |
| 2015/0373156 A1* | 12/2015 | Singh | H04L 69/18 |
| | | | 370/474 |
| 2015/0373164 A1* | 12/2015 | Anand | H04L 69/22 |
| | | | 370/471 |
| 2016/0110305 A1* | 4/2016 | Hundal | G06F 13/4022 |
| | | | 710/316 |

OTHER PUBLICATIONS

VESA, "VESA Brings DisplayPort to New USB Type-C Connector", Retrieved May 8, 2017: www.vesa.org/news/vesa-brings-displayport-to-new-usb-type-c-connector/, Sep. 22, 2014, 4 pages, USA.

* cited by examiner

200

300

400

TRANSMITTING UNIVERSAL SERIAL BUS (USB) DATA OVER ALTERNATE MODE CONNECTION

BACKGROUND ART

Interconnect channels are used to connect electronic devices such as USB devices to computing devices. For example, USB devices can include hard disk drives (HDDs) connected with long cables and thumb drives connected via short interconnect channels, among other devices and lengths of interconnect channels.

Thunderbolt™ is an interface that combines Peripheral Component Interconnect Express (PCIe) and DisplayPort (DP) interfaces into one serial signal, additionally providing DC power, all in one cable.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE ASPECTS

Figure 1:
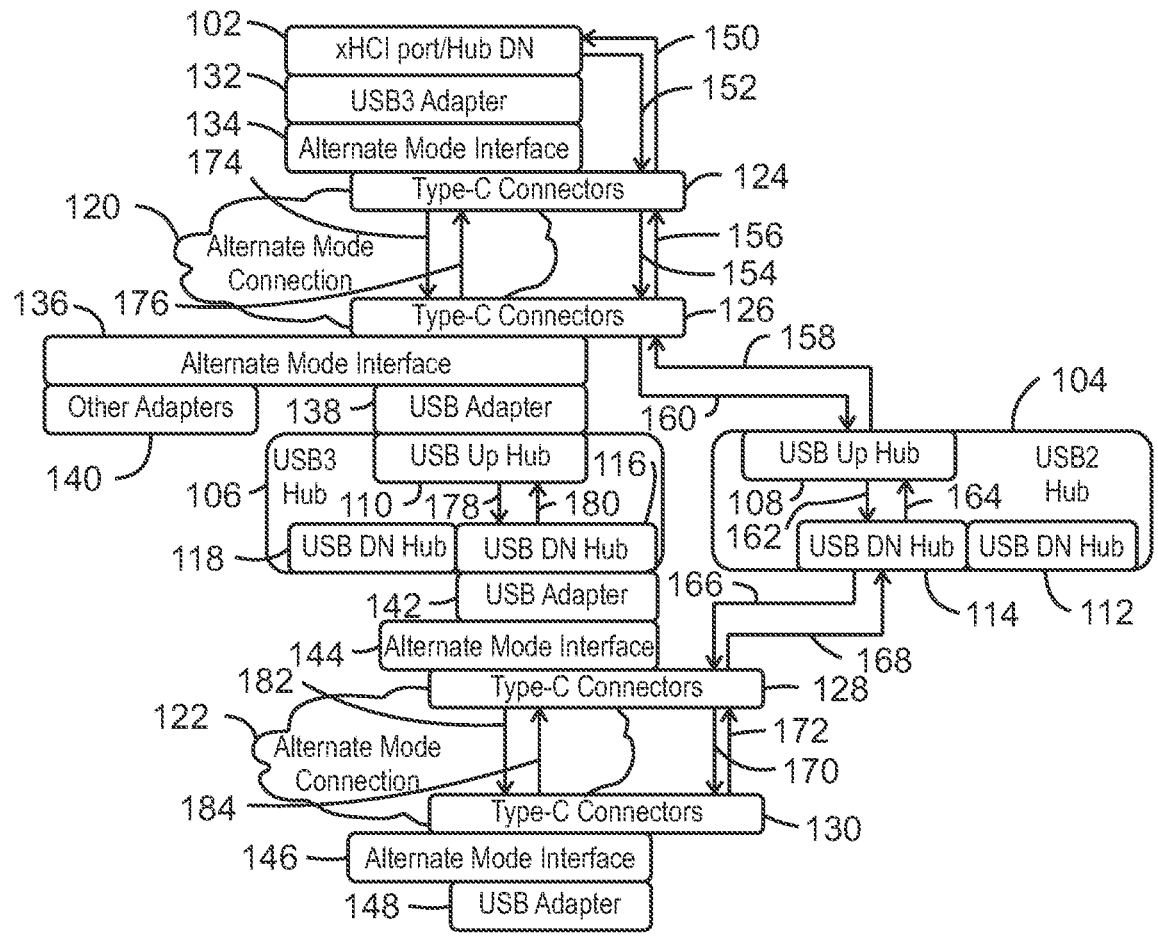
FIG. 1 is a block diagram illustrating an example system that can tunnel USB over an alternate mode interface.

As mentioned above, Thunderbolt™ is an interface that combines support for PCI Express (PCIe) and DisplayPort (DP) interfaces into one serial signal, while providing DC power all in one cable. Thunderbolt™ versions 1 and 2 utilized Mini DisplayPort connectors to connect devices. The current Thunderbolt™ version 3 utilizes a USB Type-C™ Cable and Connector according to the USB Type-C™ Cable and Connector Specification Revision 1.1, released Apr. 3, 2015. Furthermore, Thunderbolt™ version 3 is implemented using an Alternate Mode of USB Type-C™. Alternate Mode dedicates some of the physical wires in the USB Type-C cable for direct device-to-host transmission of alternate data protocols. Specifically, four high-speed lanes, two sideband pins, and (for dock, detachable device and permanent cable applications only) two USB 2.0 pins and one configuration pin can be used for Alternate Mode transmission. The modes are configured using vendor-defined messages (VDMs) through a configuration channel.

In order to enable USB tunneling over Thunderbolt™ using a Type-C™ connection, USB 2.0 and USB 3.1 transfer modes may be supported. As used herein, tunneling refers to transmitting data according to one computer network protocol that is encapsulated inside another network protocol. For example, the USB 2.0 standard includes low speed (LS), full speed (FS), and high speed (HS) modes. USB 3.x standards include SuperSpeed (SS) and SuperSpeed+(SSP) modes that can transfer data up to 5 Gbit/s and 10 Gbit/s, respectively. USB 2.0 uses a reserved set of signals within the Type-C™ connector that, once enabled in USB Type-C™ alternate mode, enables USB 2.0 functionality to coexist with an alternate mode interface. Thus, USB 2.0 functionality can co-exist on Thunderbolt™ version 3 through the use of different signaling without any tunneling. However, the USB 3.0 Specification released on Nov. 17, 2008 and the USB 3.1 Specification released on Jul. 26, 2013 do not use any reserved set of signals within the Type-C™ connector and therefore cannot currently coexist with the Thunderbolt™ alternate mode.

The present disclosure relates generally to techniques for tunneling USB 3.1 data over the Thunderbolt™ interface. Specifically, the techniques described herein include a system, method, and interface controller for transmitting USB 3.x data over Type-C connectors by generating alternate mode compliant packets. For example, the alternate mode packets can be generated at a USB transmitter adapter and transmitted over a USB Type-C cable and received at a USB receiver adapter. The USB receiver adapter can then generate USB packets corresponding to the originally received USB packets based on the alternate mode packets. For example, the USB packets can be generated based on header information in the alternate mode packets. Thus, the techniques enable USB devices connected to a Thunderbolt™ domain to be connected to a single Extensible Host Controller Interface (xHCI) controller. Moreover, no software modifications are needed as the USB packets are output by the USB receiver adapter in the same form that they were received by the USB transmitter adapter. In addition, instead of hot plugging and removing xHCI controllers through the Thunderbolt™ domain, USB hubs and USB devices can instead be more naturally hot plugged and removed. Various connection types may thus be realized through alternate modes, as enabled by the USB Type-C Specification. In particular, the USB Type-C Specification enables signal pins to be reassigned for purposes other than a USB2/USB3 data transmission. These reassignments are referred to as alternate modes. Each USB Type-C Port can support zero or more alternate modes. In embodiments, an alternate mode may be a form of operation where data is transmitted and received across pins and/or hardware, where the pins and/or hardware are indicative of a first protocol while the data is packetized, encoded/decoded, or otherwise communicated according to a second protocol.

Referring now to FIG. 1, a block diagram is shown illustrating an example system that can tunnel USB over an alternate mode interface, such as a Thunderbolt™ interface. The example system is referred to generally by the reference number 100 and can be implemented using the computing device 500 of FIG. 5 below. For example, the example system 100 can be implemented using the alternate mode interface of the computing device 126 of FIG. 1 above.

The system 100 may include an xHCI port 102. For example, the xHCI 102 port may be a Host Controller for Universal Serial bus (USB), which is capable of interfacing with USB 1.x, 2.0, and 3.x compatible devices. The system 100 also may include a USB 2.0 hub 104 and a USB 3.1 hub 106. The USB 2.0 hub 104 and USB 3.0 hub 106 include USB uplink hubs 108 and 110, respectively. The USB 2.0 hub 104 also may include two USB downlink ports 112, 114. The USB 2.1 hub 106 may include two USB downlink hubs 116, 118. The system 100 also may include two alternate mode connections 120, 122. The alternate mode connections 120 connect two Type-C ports 124, 126. The alternate mode connections 122 are coupled to two Type-C ports 128, 130. Furthermore, the system 100 may include a USB 3.x adapter 132 that is coupled to the xHCI port 102 and an alternate mode interface 134 that is coupled to the USB 3.x adapter 132. The USB 3.x adapter 132 may be referred to as a USB transmitter adapter or a USB receiver adapter depending on the direction of data flow. The system may include another alternate mode interface 136 coupled to a USB adapter 138 and one or more other adapters 140. For example, the other adapters 140 can include PCIe and DP adapters. The USB adapter 138 is further coupled to the USB uplink hub 110 of the USB 3.x hub 106. Another USB adapter 142 is coupled to the USB downlink hub 116 of the USB 3.x hub 106 and an alternate mode interface 144. The alternate mode interface 144 is coupled to a USB Type-C connection 128. Another alternate mode interface 146 is coupled to the Type-C connection 130 and a USB adapter 148.

As shown in FIG. 1, the xHCI port 102 can receive 150 and send 152 USB 2.0 traffic via the Type-C connectors 124, 126, over connections 154, 156 using a Type-C cable. As shown by arrows 158, 160, the Type-C connectors 124 can directly send USB 2.0 traffic to and from the USB 2.0 hub 104. The USB 2.0 traffic may be transmitted and received between the USB uplink hub 108 and the USB downlink hub 114 of the USB 2.0 hub, as indicated by arrows 162, 164. The USB downlink hub 114 may be coupled to USB Type-C connector 128 and send and receive USB 2.0 traffic as indicated by arrows 166, 168. The USB 2.0 traffic may then be transmitted or received between the Type-C connector 128 and the Type-C connector 130 as indicated by arrows 170, 172. For example, the USB 2.0 traffic can be sent via any suitable USB Type-C compliant cable. The USB 2.0 traffic can then be sent and received from any number of USB 2.0 devices (not shown).

The xHCI port 102 can also send and receive USB 3.x data, such as USB 3.0 data or USB 3.1 data. For example, the xHCI port 102 may receive USB 3.x data packets from a USB device and forward the packets to the USB 3.x adapter 132. The USB 3.x adapter 132 can generate alternate mode packets based on the USB 3.x packets and send the alternate mode packets to the alternate mode interface 134 for transmission. In some examples, the alternate mode packets comprise a packet header comprising a value to indicate a layer type. In some examples, the alternate mode packets can included a packet header including a field to represent a path between an upstream port and downstream port. For example, the field can indicate paths for a virtual link between an upstream USB port and a downstream USB port. In some examples, the alternate mode packets may include a packet that is to be transmitted periodically. In some examples, the alternate mode packets may each include portions of a USB packet. For example, the USB packet may be a data packet. In some examples, the alternate mode packets can include a packet header including a length field to indicate the length of a transaction in number of bytes. In some examples, the alternate mode packets can include a packet header including a field to be used for synchronization and error checking.

As shown by arrows 174, 176 in FIG. 1, the alternate mode packets can be sent and received between the Type-C connectors 124, 126. For example, the alternate mode packets can be sent and receive via a USB Type-C cable. The alternate mode interface 136 can receive alternate mode packets and forward them to the USB 3.x adapter 138. The USB 3.x adapter 138 can then generate USB 3.x packets based on the received alternate mode packets. For example, the USB 3.x adapter 138 can join two or more alternate mode packets using header information included in the alternate mode packets. The generated USB packets can then be sent to the USB 3.x hub 106. The USB 3.x packets can be transmitted and received between the USB uplink hub 110 and USB downlink hub 116 of the USB 3.x hub 106 as indicated by arrows 178, 180. In some examples, the USB packets can be sent to one or more USB 3.x devices (not shown) via the USB downlink hub 118. In some examples, the USB 3.x packets can be sent to the USB adapter 142. The USB adapter 142 can generate alternate mode packets to be sent to the alternate mode interface 144 and transmitted between the Type-C connectors 128, 130 as shown by arrows 182, 184. For example, the alternate mode packets can be transmitted over a USB Type-C cable. The alternate mode interface 146 may receive alternate mode packets from the Type-C port 130 and send the packets to the USB adapter 148. For example, the USB adapter 148 may be a USB receiver adapter. The USB adapter 148 may generate USB packets based on the received alternate mode packets. For example, the USB adapter 148 can restore the USB packets based on the alternate mode packets by removing an alternate mode header from the alternate mode packets. In some examples, the USB receiver adapter 148 can restore the USB packets based on the alternate mode packets by combining data from two or more alternate mode packets. In some examples, the alternate mode packets can include a packet header including a value to be used by the USB adapter 148 to parse commands and data. Thus, a USB virtual link can be established between the downstream and the upstream ports using at least one alternate mode path.

The diagram of FIG. 1 is not intended to indicate that the example system 100 is to include all of the components shown in FIG. 1. Rather, the example system 100 can be implemented using fewer or additional components not illustrated in FIG. 1 (e.g., additional hubs, USB adapters, ports, connections, etc.).

Figure 2:
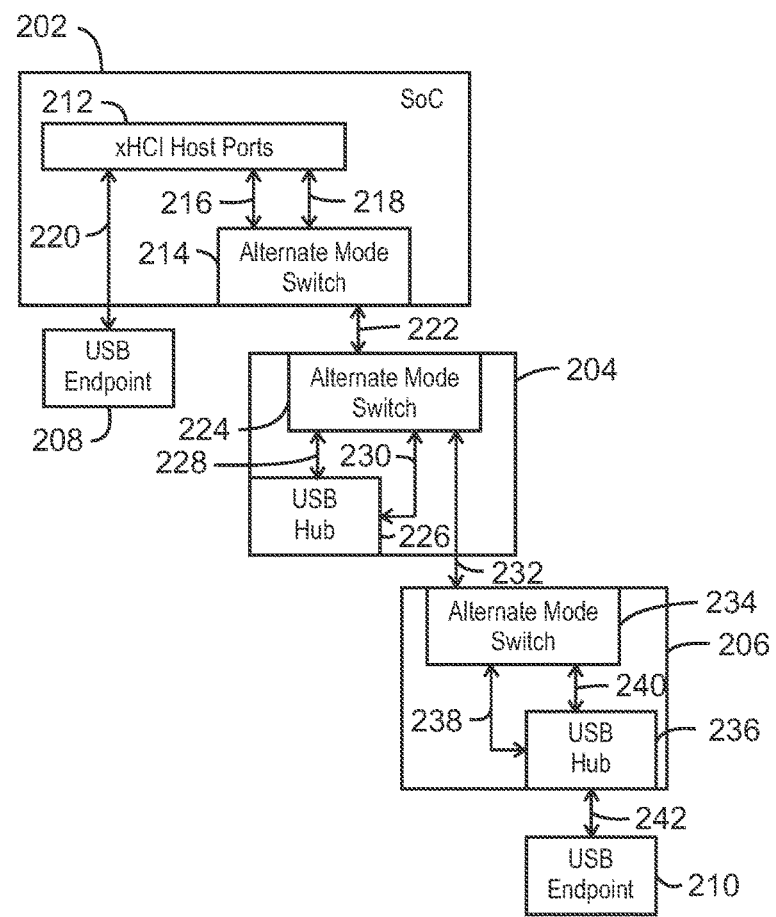
FIG. 2 is a block diagram illustrating an example physical topology for tunneling USB over an alternate mode interface.

FIG. 2 is a block diagram illustrating an example physical topology for tunneling USB over an alternate mode interface, such as a Thunderbolt™ interface. The example physical topology is referred to generally by the reference number 200 and can be implemented using the computing device 500 of FIG. 5 below. For example, the example physical topology 200 can be implemented in the alternate mode interface of the computing device of FIG. 1. For example, the SoC 202 can be implemented in the computing device of FIG. 1 above.

The physical topology 200 may include a system-on-chip (SoC) 202. The SoC 202 may include a number of xHCI ports 212 connected to an alternate mode switch 214 via connections 216, 218. For example, the alternate mode switch 214 can be a Thunderbolt™ switch. One of the xHCI Host ports 212 is also shown connected to a USB endpoint 208 as shown by an arrow 220. The alternate mode switch 214 is shown via an arrow 222 as coupled to the alternate mode switch 224 of the alternate mode device 204. For example, the alternate mode switches 214, 224 may be coupled via a USB Type-C cable. The alternate mode switch 224 is also shown coupled to a USB hub 226 of the alternate mode device 204 via connections 228, 230. The alternate mode switch 224 is also further shown coupled via an arrow 232 to the alternate mode switch 234 of the alternate mode device 206. The alternate mode switch 234 is shown coupled to the USB Hub 236 of the alternate mode device 206 via connections 238, 240. The USB hub 236 is also shown coupled to the USB endpoint 210 via the connection 242.

In the example physical topology 200, one or more USB 3.x data streams can be sent and received from the xHCI ports 212 to the alternate mode switch 214 via the connections 216, 218. The alternate mode switches 214, 224, 234 may each have a USB adapter for generating alternate mode packets to be sent over connections 222, 232. The USB adapters can also generate USB packets from the alternate mode packets to be sent to USB hubs 226, 236 for delivery to any number of USB endpoints 210. Thus, the alternate mode switches can be used to add USB 3.x functionality while maintaining compatibility with USB endpoint devices 208, 210. The functionality of the USB adapters is discussed at greater length with respect to FIG. 5 below.

The diagram of FIG. 2 is not intended to indicate that the example physical topology 200 is to include all of the components shown in FIG. 2. Rather, the example physical topology 200 can be implemented using fewer or additional components not illustrated in FIG. 2 (e.g., additional ports, switches, hubs, endpoints, etc.).

Figure 3:
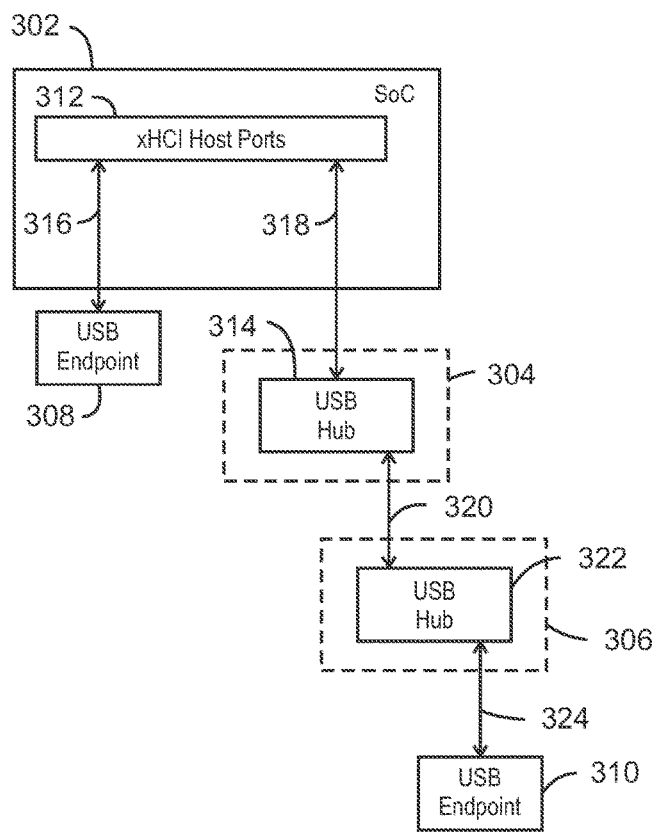
FIG. 3 is a cross section of an example logical topology for tunneling USB over an alternate mode interface.

FIG. 3 is a cross section of an example logical topology for tunneling USB over an alternate mode interface, such as a Thunderbolt™ interface. The example logical topology is referred to generally by the reference number 300 and can be implemented using the computing device 500 of FIG. 5 below. For example, the example logical topology 300 can correspond to the physical topology 200 of FIG. 2 and be implemented in the alternate mode interface 526 of the computing device of FIG. 5 below.

The logical topology 300 may include system-on-chip (SoC) 302 and alternate mode devices 304, 306 coupled to USB end points 308, 310. For example, the alternate mode devices 304, 306 can be Thunderbolt™ devices. The SoC 302 may include a number of xHCI host ports 312 connected to the USB end point 308 and a USB hub 314 of the alternate mode device 304 as shown by arrows 316 and 318, respectively. For example, the arrow 318 may represent an alternate mode connection using a USB Type-C connector. The USB hub 314 is further coupled to USB hub 322 as shown by an arrow 320. The arrow 320 may represent an alternate mode connection using a USB Type-C connector.

As shown in FIG. 3, the logical topology 300 is shown as a series of USB hubs 314, 322 connecting an xHCI host port 312 and a USB endpoint 310. Although the alternate mode packets are used during transmission over the connections 318 and 320, the logical topology 300 appears similar to a series of USB hubs connected via two alternate mode connections 318 and 320.

The diagram of FIG. 3 is not intended to indicate that the example logical topology 300 is to include all of the components shown in FIG. 3. Rather, the example logical topology 300 can be implemented using fewer or additional components not illustrated in FIG. 3 (e.g., additional ports, USB hubs, USB endpoints, SoCs, etc.).

Figure 4:
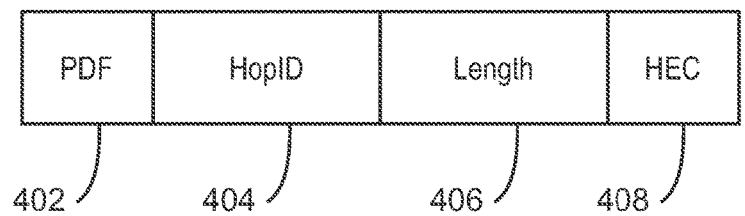
FIG. 4 is a block diagram of an example alternate mode packet header.

FIG. 4. is a block diagram of an example alternate mode packet header. The example packet header is referred to generally by the reference number 400 and can be implemented using the system 100 of FIG. 1 above. For example, the example packet header 400 can be sent and received by the USB adapters 138, 142 of FIG. 1 above.

The packet header 400 includes a protocol-defined field (PDF) 402, a HopID field 404, a length field 406, and a Header Error Control/Check (HEC) field 408. In some examples, the PDF 402 may be 4 bits in size, the HopID field 404 may be 12 bits in size, the length field 406 may be 8 bits in size, and the HEC field 408 may be 8 bits in size.

In the example packet header 400, the PDF field 402 can be used by USB receiver adapters to parse commands and data. For example, USB transmitter adapters may encode the PDF 402 to indicate the type of layer that is sending information. For example, a low-frequency periodic signaling (LFPS) layer can be indicated using the value 0000b.

In some examples, an ordered set can be indicated in the PDF 402 field using the value 0001b. The ordered set value can be used to pass Training Sequence 1 (TS1), Training Sequence 2 (TS2), Start Data Stream (SDS) Ordered Set (OS) information.

In some examples, a link layer can be indicated in the PDF 402 of the alternate mode packet header using the value 0010b. The link layer can be used to pass link command information. Link layer packets can include two DWORDs of data covering a full 8 symbol Link Command.

In some examples, a protocol layer including Link Management Packets (LMPs), Transaction Packets (TPs), Isochronous Timestamp Packets (ITPs), and data packet headers (DPHs) can be indicated using the value 0011b. This protocol layer packet can be used to pass protocol layer headers. For example, the packet can include five or six DWORDs of data covering the full structure of the protocol layer packets.

In some examples, a protocol layer data packets can be defined using three protocol-defined field (PDF) 402 values. For example, as a USB packet can be longer than an alternate mode packet, the USB packets can be segmented at the USB transmitting adapter and re-assembled on the USB receiving adapter. For example, a start/single segment data packet can be indicated using the value 0100b, a protocol layer middle segment data packet can be indicated by the value 0101b, and a protocol layer end segment data packet can be indicated by the value 0110b. In some examples, the values 0111b-1111b can be reserved for indicating additional optional layers or functions.

In some examples, the HopID field 404 can be used to indicate paths for each virtual link between an upstream and downstream USB port.

In some examples, the length field 406 can be used to indicate the length of a particular packet. For example, data packets may be of variable length depending on the data being sent. Therefore, the length field 406 can be used to indicate a transaction's data in number of bytes.

In some examples, the HEC field 408 can be used to synchronize and check for errors in alternate mode packets. For example, the HEC field 408 can be used to validate the correctness of the headers.

The diagram of FIG. 4 is not intended to indicate that the example packet header 400 is to include all of the components shown in FIG. 4. Rather, the example packet header 400 can be implemented using fewer or additional components not illustrated in FIG. 4 (e.g., additional fields, field values, etc.). For example, the particular structure of the packet header may depend on the protocol over which USB 3.x is to be tunneled.

Figure 5:
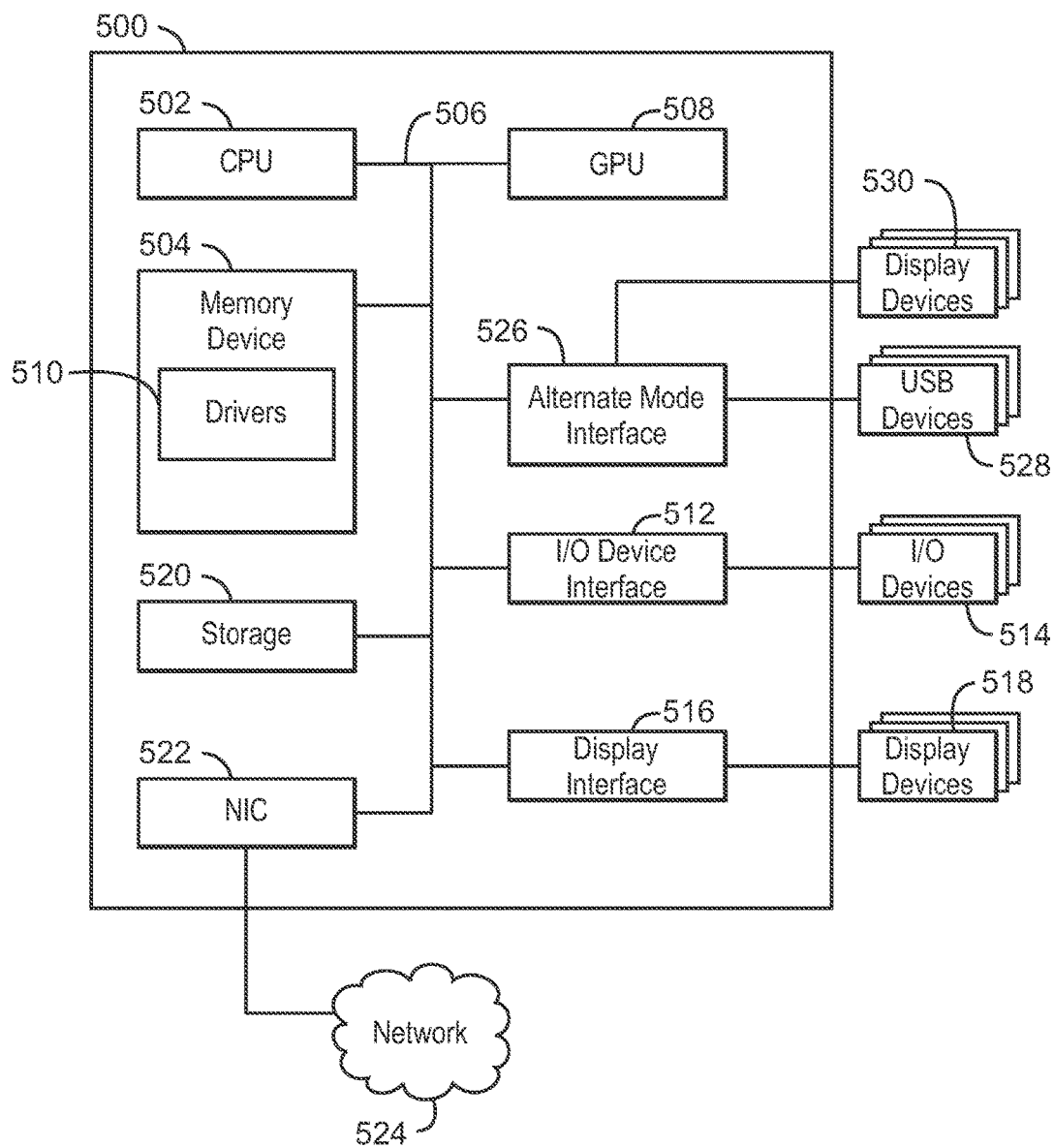
FIG. 5 is block diagram illustrating an example computing device that can tunnel USB over an alternate mode interface.

FIG. 5 is a block diagram illustrating an example computing device that can tunnel USB over an alternate mode interface. The computing device 500 may be, for example, a laptop computer, desktop computer, tablet computer, mobile device, or server, among others. The computing device 500 may include a central processing unit (CPU) 502 that is configured to execute stored instructions, as well as a memory device 504 that stores instructions that are executable by the CPU 502. The CPU 502 may be coupled to the memory device 504 by a bus 506. Additionally, the CPU 502 can be a single core processor, a multi-core processor, a computing cluster, or any number of other configurations. Furthermore, the computing device 500 may include more than one CPU 502. The memory device 504 can include random access memory (RAM), read only memory (ROM), flash memory, or any other suitable memory systems. For example, the memory device 504 may include dynamic random access memory (DRAM).

The computing device 500 may also include a graphics processing unit (GPU) 508. As shown, the CPU 502 may be coupled through the bus 506 to the GPU 508. The GPU 508 may be configured to perform any number of graphics operations within the computing device 500. For example, the GPU 508 may be configured to render or manipulate graphics images, graphics frames, videos, or the like, to be displayed to a user of the computing device 500.

The memory device 504 can include random access memory (RAM), read only memory (ROM), flash memory, or any other suitable memory systems. For example, the memory device 504 may include dynamic random access memory (DRAM). The memory device 504 may include device drivers 510 that are configured to execute the instructions for device discovery. The device drivers 510 may be software, an application program, application code, or the like.

The CPU 502 may also be connected through the bus 506 to an input/output (I/O) device interface 512 configured to connect the computing device 500 to one or more I/O devices 514. The I/O devices 514 may include, for example, a keyboard and a pointing device, wherein the pointing device may include a touchpad or a touchscreen, among others. The I/O devices 514 may be built-in components of the computing device 500, or may be devices that are externally connected to the computing device 500. In some examples, the memory 504 may be communicatively coupled to I/O devices 514 through direct memory access (DMA).

The CPU 502 may also be linked through the bus 506 to a display interface 516 configured to connect the computing device 500 to a display device 518. The display device 518 may include a display screen that is a built-in component of the computing device 500. The display device 518 may also include a computer monitor, television, or projector, among others, that is internal to or externally connected to the computing device 500.

The computing device also includes a storage device 520. The storage device 520 is a physical memory such as a hard drive, an optical drive, a thumbdrive, an array of drives, or any combinations thereof. The storage device 520 may also include remote storage drives.

The computing device 500 may also include a network interface controller (NIC) 522. The NIC 522 may be configured to connect the computing device 500 through the bus 506 to a network 524. The network 524 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The CPU 502 may also be linked through the bus 506 to an alternate mode interface 526 configured to connect the computing device 500 to any number of USB 3.1 devices 528. For example, the USB devices can include USB 2.0 devices as well as USB 3.1 devices. In some examples, the alternate mode interface 526 can be a Thunderbolt™ interface. The alternate mode interface 526 can also be configured to connect the computing device 500 to any number of display devices. For example, the alternate mode interface 526 can be connected to the USB devices 528 and the display devices 530 via any suitable connection, such as a Type-C USB connection.

The block diagram of FIG. 5 is not intended to indicate that the computing device 500 is to include all of the components shown in FIG. 5. Rather, the computing device 500 can include fewer or additional components not illustrated in FIG. 5, such as additional USB devices, additional display devices, and the like. The computing device 500 may include any number of additional components not shown in FIG. 5, depending on the details of the specific implementation. Furthermore, any of the functionalities of the CPU 502 may be partially, or entirely, implemented in hardware and/or in a processor.

Figure 6:
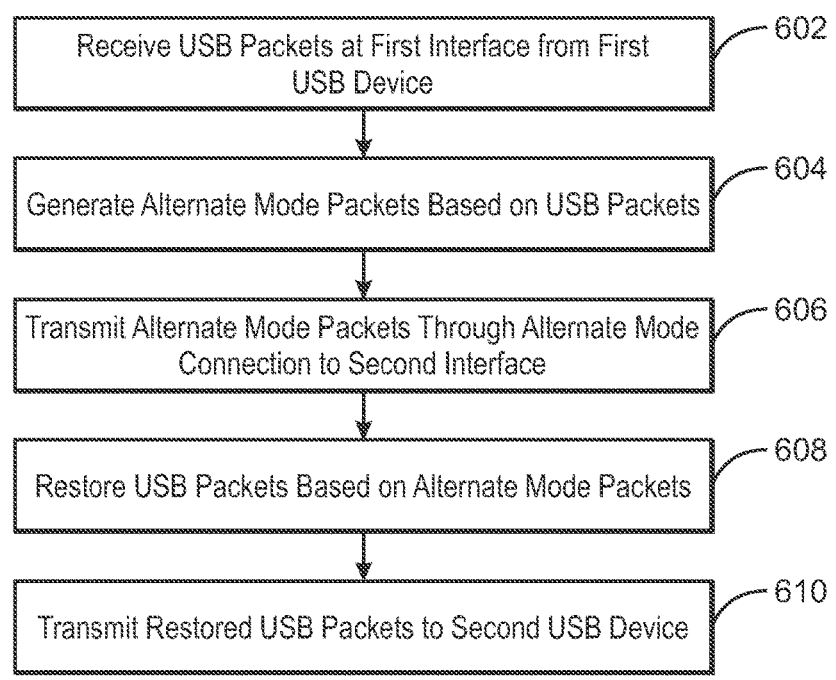
FIG. 6 is a flow chart illustrating a method for tunneling USB over an alternate mode interface.

FIG. 6 is a flow chart illustrating a method for tunneling USB over an alternate mode interface 526, such as a Thunderbolt™ interface. The example method is generally referred to by the reference number 600 and can be implemented using the alternate mode interface 526 of FIG. 5 above.

At block 602, a first interface receives USB packets from first USB device. For example, the first interface can be a USB transmitter adapter.

At block 604, the first interface generates alternate mode packets based on the USB packets. For example, the first interface can add an alternate mode packet header to the USB packets. In some examples, the USB packets can be segmented into alternate mode packets at the first interface.

At block 606, the first interface transmits alternate mode packets via an alternate mode connection to a second interface. For example, the second interface can be a USB receiver adapter. In some examples, the alternate mode connection can be a USB Type-C cable.

At block 608, the second interface restores the USB packets based on the received alternate mode packets. For example, the second interface can remove the alternate mode packet header from the alternate mode packets to restore the USB packets. In some examples, the second interface combine two or more alternate mode packets to restore segmented USB packets.

At block 610, the second interface transmits the restored USB packets to a second USB device. For example, the second USB device may detect the received USB packets as if the second USB device was connected to the first USB device via a USB hub. The alternate mode connection may thus be transparent to the first USB device and the second USB device.

In some examples, the second USB device may send USB packets to the first USB device in the same way that the first USB device sent packets to the second USB device as described above in blocks 602-610.

This process flow diagram is not intended to indicate that the blocks of the example process 600 are to be executed in any particular order, or that all of the blocks are to be included in every case. Further, any number of additional blocks not shown may be included within the example process 600, depending on the details of the specific implementation.

Figure 7:
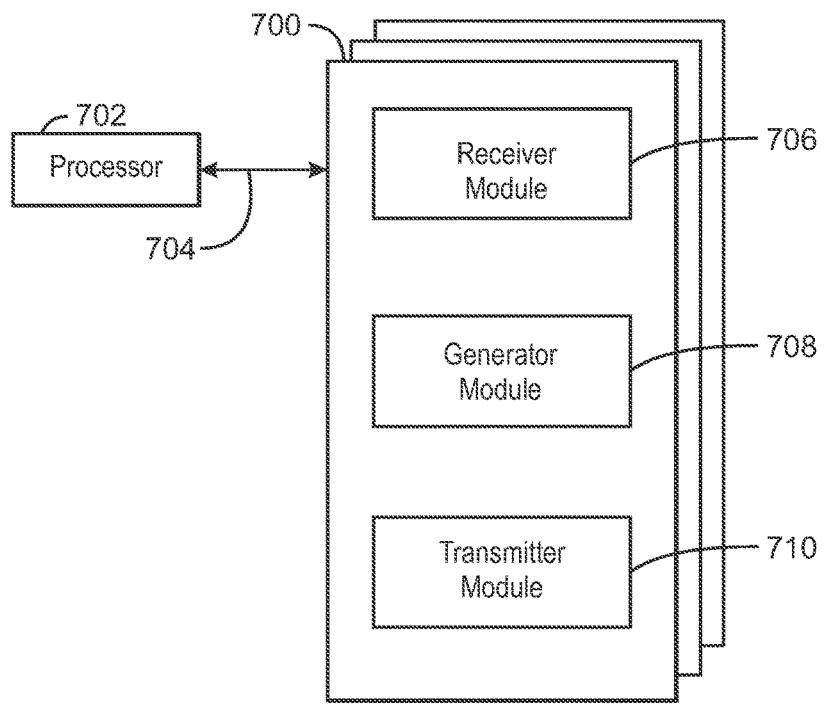
FIG. 7 is a block diagram showing computer readable media that store code for tunneling USB over an alternate mode interface.

FIG. 7 is a block diagram showing computer readable media 700 that store code for tunneling USB over an alternate mode interface. The computer readable media 700 may be accessed by a processor 702 over a computer bus 704. Furthermore, the computer readable medium 700 may include code configured to direct the processor 702 to perform the methods described herein. In some embodiments, the computer readable media 700 may be non-transitory computer readable media. In some examples, the computer readable media 700 may be storage media. However, in any case, the computer readable media do not include transitory media such as carrier waves, signals, and the like.

The block diagram of FIG. 7 is not intended to indicate that the computer readable media 700 is to include all of the components shown in FIG. 7. Further, the computer readable media 700 may include any number of additional components not shown in FIG. 7, depending on the details of the specific implementation.

The various software components discussed herein may be stored on one or more computer readable media 700, as indicated in FIG. 7. For example, a receiver module 706 may be configured to receive USB packets from a first USB device. For example the USB device may be a USB 3.x device. The USB packets may be data packets. A generator module 708 may generate alternate mode packets based on the USB packets. For example, the alternate mode packets may be Thunderbolt™ packets. In some examples, the generator module 708 may add an alternate mode packet header to the USB packets. In some examples, the generator module 708 may parse commands and data via headers of the alternate mode packets. In some examples, the generator module 708 may segment the USB packets into alternate mode packets. A transmitter module 710 may transmit the alternate mode packets to an interface coupled to a second USB device. For example, the second USB device may be a USB 3.x device. The interface may be an alternate mode interface. For example, the interface may be a Thunderbolt™ interface.

In some examples, the receiver module 706 may receive a second set of alternate mode packets from the interface. In some examples, the generator module 708 may generate USB packets based on the alternate mode packets. For example, the USB packets may be USB 3.x packets. In some examples, the generator module 708 may remove an alternate mode packet header from the alternate mode packets. In some examples, the generator module 708 may combine a plurality of the alternate mode packets to restore a segmented USB packet. In some examples, the transmitter module 710 may transmit the restored USB packets to the first USB device. In some examples, the alternate mode packets are thus transparent to the first USB device and the second USB device. For example, the first USB device and the second USB may not detect the alternate mode packets.

The block diagram of FIG. 7 is not intended to indicate that the computer readable media 700 is to include all of the components shown in FIG. 7. Further, the computer readable media 700 may include any number of additional components not shown in FIG. 7, depending on the details of the specific implementation.

EXAMPLES

Example 1 is an apparatus for transmitting Universal Serial Bus (USB) packets. The apparatus for transmitting Universal Serial Bus (USB) packets includes a transmitter adapter to receive a USB packet from a USB device. The transmitter adapter is to also generate one or more alternate mode packets based on the USB packet. The transmitter adapter is further to transmit the alternate mode packets via an alternate mode connection.

Example 2 includes the apparatus for transmitting Universal Serial Bus (USB) packets of example 1, including or excluding optional features. In this example, the USB packets include USB 3.x packets.

Example 3 includes the apparatus for transmitting Universal Serial Bus (USB) packets of any one of examples 1 to 2, including or excluding optional features. In this example, the alternate mode packets include a packet header including a value to indicate a layer type.

Example 4 includes the apparatus for transmitting Universal Serial Bus (USB) packets of any one of examples 1 to 3, including or excluding optional features. In this example, the alternate mode packets include a packet header including a field to represent a path between an upstream port and downstream port.

Example 5 includes the apparatus for transmitting Universal Serial Bus (USB) packets of any one of examples 1 to 4, including or excluding optional features. In this example, the alternate mode packets include a packet that is to be transmitted periodically.

Example 6 includes the apparatus for transmitting Universal Serial Bus (USB) packets of any one of examples 1 to 5, including or excluding optional features. In this example, the alternate mode packets include portions of the USB packet, wherein the USB packet includes a data packet.

Example 7 includes the apparatus for transmitting Universal Serial Bus (USB) packets of any one of examples 1 to 6, including or excluding optional features. In this example, the alternate mode packets include a packet header including a field to indicate paths for a virtual link between an upstream USB port and a downstream USB port.

Example 8 includes the apparatus for transmitting Universal Serial Bus (USB) packets of any one of examples 1 to 7, including or excluding optional features. In this example, the alternate mode packets include a packet header including a length field to indicate the length of a transaction in number of bytes.

Example 9 includes the apparatus for transmitting Universal Serial Bus (USB) packets of any one of examples 1 to 8, including or excluding optional features. In this example, the alternate mode packets include a packet header including a field to be used for synchronization and error checking.

Example 10 includes the apparatus for transmitting Universal Serial Bus (USB) packets of any one of examples 1 to 9, including or excluding optional features. In this example, the alternate mode connection includes a USB Type-C cable.

Example 11 is an apparatus for receiving USB packets over an alternate mode interface. The apparatus includes a receiver adapter to: receive, via an alternate mode connection, alternate mode packets from a USB transmitter adapter; restore USB packets based on the alternate mode packets; and transmit the USB packets to a USB device.

Example 12 includes the apparatus of example 11, including or excluding optional features. In this example, the alternate mode connection includes a USB Type-C cable.

Example 13 includes the apparatus of any one of examples 11 to 12, including or excluding optional features. In this example, the receiver adapter is to restore the USB packets based on the alternate mode packets by removing an alternate mode header from the alternate mode packets.

Example 14 includes the apparatus of any one of examples 11 to 13, including or excluding optional features. In this example, the receiver adapter is to restore the USB packets based on the alternate mode packets by combining two or more alternate mode packets.

Example 15 includes the apparatus of any one of examples 11 to 14, including or excluding optional features.

In this example, the alternate mode packets include a packet header including a value to be used by the receiver adapter to parse commands and data.

Example 16 includes the apparatus of any one of examples 11 to 15, including or excluding optional features. In this example, the alternate mode packets includes a header including a field to be used for synchronization and error checking.

Example 17 includes the apparatus of any one of examples 11 to 16, including or excluding optional features. In this example, the USB packets include data packets.

Example 18 includes the apparatus of any one of examples 11 to 17, including or excluding optional features. In this example, the receiver adapter is further coupled to Extensible Host Controller Interface (xHCI) controller, wherein the xHCI controller is to send USB 3.x packets to the receiver adapters and USB 2.0 packets directly to the alternate mode connection.

Example 19 includes the apparatus of any one of examples 11 to 18, including or excluding optional features. In this example, receiver adapter includes a USB receiver adapter.

Example 20 includes the apparatus of any one of examples 11 to 19, including or excluding optional features. In this example, the apparatus includes an interface.

Example 21 is a method for transmitting USB packets. The method includes receiving, at a first interface, USB packets from a first USB device; generating, at the first interface, alternate mode packets based on the USB packets; transmitting, via an alternate mode connection, the alternate mode packets to a second interface; restoring, via the second interface, the USB packets based on the alternate mode packets; and transmitting, via the second interface, the restored USB packets to a second USB device.

Example 22 includes the method of example 21, including or excluding optional features. In this example, the first interface includes a USB transmitter adapter and the second interface includes a USB receiver adapter.

Example 23 includes the method of any one of examples 21 to 22, including or excluding optional features. In this example, generating the alternate mode packets based on the USB packets includes adding an alternate mode packet header to the USB packets.

Example 24 includes the method of any one of examples 21 to 23, including or excluding optional features. In this example, restoring the USB packets based on the alternate mode packets includes removing the alternate mode packet header from the alternate mode packets.

Example 25 includes the method of any one of examples 21 to 24, including or excluding optional features. In this example, the USB packets are USB 3.x packets.

Example 26 includes the method of any one of examples 21 to 25, including or excluding optional features. In this example, the first USB device and the second USB device are USB 3.x devices.

Example 27 includes the method of any one of examples 21 to 26, including or excluding optional features. In this example, generating the alternate mode packets based on the USB packets includes segmenting the USB packets into alternate mode packets.

Example 28 includes the method of any one of examples 21 to 27, including or excluding optional features. In this example, restoring the USB packets includes combining a plurality of the alternate mode packets to restore a segmented USB packet.

Example 29 includes the method of any one of examples 21 to 28, including or excluding optional features. In this example, the alternate mode connection is transparent to the first USB device and the second USB device.

Example 30 includes the method of any one of examples 21 to 29, including or excluding optional features. In this example, the method includes transmitting a second set of USB packets from the second USB device to the first USB device via the second interface, the alternate mode connection, and the first interface.

Example 31 is a system for transmitting Universal Serial Bus (USB) packets. The system includes means for receiving a USB packet from a USB device; means for generating one or more alternate mode packets based on the USB packet; and means for transmitting the alternate mode packets via an alternate mode connection.

Example 32 includes the system of example 31, including or excluding optional features. In this example, the USB packets include USB 3.x packets.

Example 33 includes the system of any one of examples 31 to 32, including or excluding optional features. In this example, the alternate mode packets include a packet header including a value to indicate a layer type.

Example 34 includes the system of any one of examples 31 to 33, including or excluding optional features. In this example, the alternate mode packets include a packet header including a field to represent a path between an upstream port and downstream port.

Example 35 includes the system of any one of examples 31 to 34, including or excluding optional features. In this example, the alternate mode packets include a packet that is to be transmitted periodically.

Example 36 includes the system of any one of examples 31 to 35, including or excluding optional features. In this example, the alternate mode packets include portions of the USB packet, wherein the USB packet includes a data packet.

Example 37 includes the system of any one of examples 31 to 36, including or excluding optional features. In this example, the alternate mode packets include a packet header including a field to indicate paths for a virtual link between an upstream USB port and a downstream USB port.

Example 38 includes the system of any one of examples 31 to 37, including or excluding optional features. In this example, the alternate mode packets include a packet header including a length field to indicate the length of a transaction in number of bytes.

Example 39 includes the system of any one of examples 31 to 38, including or excluding optional features. In this example, the alternate mode packets include a packet header including a field to be used for synchronization and error checking.

Example 40 includes the system of any one of examples 31 to 39, including or excluding optional features. In this example, the alternate mode connection includes a USB Type-C cable.

Example 41 is a system for receiving USB packets over an alternate mode interface. The system includes means for receiving, via an alternate mode connection, alternate mode packets from a transmitter adapter; means for restoring USB packets based on the alternate mode packets; and means for transmitting the USB packets to a USB device.

Example 42 includes the system of example 41, including or excluding optional features. In this example, the alternate mode connection includes a USB Type-C cable.

Example 43 includes the system of any one of examples 41 to 42, including or excluding optional features. In this example, the means for restoring USB packets is to restore the USB packets based on the alternate mode packets by removing an alternate mode header from the alternate mode packets.

Example 44 includes the system of any one of examples 41 to 43, including or excluding optional features. In this example, the means for restoring USB packets is to restore the USB packets based on the alternate mode packets by combining data from two or more alternate mode packets.

Example 45 includes the system of any one of examples 41 to 44, including or excluding optional features. In this example, the alternate mode packets include a packet header including a value to be used by the USB receiver adapter to parse commands and data.

Example 46 includes the system of any one of examples 41 to 45, including or excluding optional features. In this example, the alternate mode packets includes a header including a field to be used for synchronization and error checking.

Example 47 includes the system of any one of examples 41 to 46, including or excluding optional features. In this example, the USB packets include data packets.

Example 48 includes the system of any one of examples 41 to 47, including or excluding optional features. In this example, the means for receiving alternate mode packets is coupled to Extensible Host Controller Interface (xHCI) controller, wherein the xHCI controller is to send USB 3.x packets to the receiver adapters and USB 2.0 packets directly to the alternate mode connection.

Example 49 includes the system of any one of examples 41 to 48, including or excluding optional features. In this example, the means for restoring USB packets includes a USB receiver adapter.

Example 50 includes the system of any one of examples 41 to 49, including or excluding optional features. In this example, the means for receiving alternate mode packets includes an interface.

Example 51 is at least one computer readable medium for transmitting USB packets having instructions stored therein that. The computer-readable medium includes instructions that direct the processor to receive USB packets from a first USB device. The computer-readable medium also includes instructions that direct the processor to generate alternate mode packets based on the USB packets. The computer-readable medium further includes instructions that direct the processor to transmit the alternate mode packets to an interface coupled to a second USB device.

Example 52 includes the computer-readable medium of example 51, including or excluding optional features. In this example, the computer-readable medium includes instructions to receive a second set of alternate mode packets from the interface. The computer-readable medium also includes instructions that direct the processor to generate USB packets based on the alternate mode packets. The computer-readable medium further includes instructions that direct the processor to transmit the restored USB packets to the first USB device.

Example 53 includes the computer-readable medium of any one of examples 51 to 52, including or excluding optional features. In this example, the USB packets include data packets.

Example 54 includes the computer-readable medium of any one of examples 51 to 53, including or excluding optional features. In this example, the computer-readable medium includes instructions to add an alternate mode packet header to the USB packets.

Example 55 includes the computer-readable medium of any one of examples 51 to 54, including or excluding optional features. In this example, the computer-readable medium includes instructions to remove an alternate mode packet header from the alternate mode packets.

Example 56 includes the computer-readable medium of any one of examples 51 to 55, including or excluding optional features. In this example, the first USB device and the second USB device are USB 3.x devices.

Example 57 includes the computer-readable medium of any one of examples 51 to 56, including or excluding optional features. In this example, the computer-readable medium includes instructions to segment the USB packets into alternate mode packets.

Example 58 includes the computer-readable medium of any one of examples 51 to 57, including or excluding optional features. In this example, the computer-readable medium includes instructions to combine a plurality of the alternate mode packets to restore a segmented USB packet.

Example 59 includes the computer-readable medium of any one of examples 51 to 58, including or excluding optional features. In this example, the alternate mode packets are transparent to the first USB device and the second USB device.

Example 60 includes the computer-readable medium of any one of examples 51 to 59, including or excluding optional features. In this example, the computer-readable medium includes instructions to parse commands and data via headers of the alternate mode packets.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for transmitting Universal Serial Bus (USB) packets, comprising:
a controller communicatively coupled to a transmitter adapter and an alternate mode connection, the controller to send USB 3.x packets to the transmitter adapter and USB 2.0 packets directly to the alternate mode connection, the transmitter adapter to:
receive a USB 3.x packet from the controller;
generate one or more alternate mode packets based on the USB 3.x packet, wherein the one or more alternate mode packets comprise data packets defined in packet headers of the one or more alternate mode packets using a plurality of different protocol-defined field (PDF) values comprising a PDF value indicating a start or single segment data packet; and
transmit the one or more alternate mode packets via the alternate mode connection.

2. The apparatus of claim 1, wherein the one or more alternate mode packets comprise a packet header comprising a value to indicate a layer type.

3. The apparatus of claim 1, wherein the one or more alternate mode packets comprise a packet header comprising a field to represent a path between an upstream port and downstream port.

4. The apparatus of claim 1, wherein the one or more alternate mode packets comprise a packet that is to be transmitted periodically.

5. The apparatus of claim 1, wherein the one or more alternate mode packets comprise portions of the USB 3.x packet, wherein the USB 3.x packet comprises a data packet.

6. The apparatus of claim 1, wherein the one or more alternate mode packets comprise a packet header comprising a field to indicate paths for a virtual link between an upstream USB port and a downstream USB port.

7. The apparatus of claim 1, wherein the one or more alternate mode packets comprise a packet header comprising a length field to indicate a length of a transaction in number of bytes.

8. The apparatus of claim 1, wherein the one or more alternate mode packets comprise a packet header comprising a field to be used for synchronization and error checking.

9. The apparatus of claim 1, wherein the alternate mode connection comprises a USB Type-C cable.

10. The apparatus of claim 1, wherein the different protocol-defined field (PDF) values comprise a PDF value indicating a middle segment data packet, and a PDF value indicating an end segment data packet.

11. An apparatus for receiving USB packets over an alternate mode interface, comprising:
a controller communicatively coupled to a receiver adapter and an alternate mode connection, the controller to receive USB 3.x packets from the receive adapter and USB 2.0 packets directly from the alternate mode connection and send the USB 2.0 packets and the USB 3.x packets to a USB device; the receiver adapter to:
receive, via the alternate mode connection, one or more alternate mode packets from a transmitter adapter, wherein the one or more alternate mode packets comprise data packets defined in packet headers of the one or more alternate mode packets using a plurality of different protocol-defined field (PDF) values comprising a PDF value indicating a start or single segment data packet;
restore a USB 3.x packet based on the one or more alternate mode packets; and
transmit the USB 3.x packet to the USB device via the controller.

12. The apparatus of claim 11, wherein the alternate mode connection comprises a USB Type-C cable.

13. The apparatus of claim 11, wherein the receiver adapter is to restore the USB 3.x packet based on the one or more alternate mode packets by removing an alternate mode header from the one or more alternate mode packets.

14. The apparatus of claim 11, wherein the receiver adapter is to restore the USB 3.x packet based on the one or more alternate mode packets by combining two or more alternate mode packets.

15. The apparatus of claim 11, wherein the one or more alternate mode packets comprise a packet header comprising a value to be used by the receiver adapter to parse commands and data.

16. A method for transmitting USB packets, comprising:
receiving, at a first controller, USB packets from a first USB device;
sending, via the first controller, the USB packets to a first interface in response to detecting that the USB packets are USB 3.x packets;
generating, at the first interface, one or more alternate mode packets based on the USB 3.x packets, wherein the one or more alternate mode packets comprise data packets defined in packet headers of the one or more alternate mode packets using a plurality of different protocol-defined field (PDF) values comprising a PDF value indicating a start or single segment data packet;
transmitting, via an alternate mode connection, the one or more alternate mode packets to a second interface;
restoring, via the second interface, the USB 3.x packets based on the one or more alternate mode packets; and
transmitting, via a second controller communicatively coupled to the second interface, the restored USB 3.x packets to a second USB device.

17. The method of claim 16, wherein the first interface comprises a transmitter adapter and the second interface comprises a receiver adapter.

18. The method of claim 16, wherein the USB 3.x packets are to be segmented into alternate mode packets at the first interface.

19. The method of claim 16, wherein generating the one or more alternate mode packets based on the USB 3.x packets comprises adding an alternate mode packet header to the USB 3.x packets and restoring the USB 3.x packets based on the one or more alternate mode packets comprises removing the alternate mode packet header from the one or more alternate mode packets.

20. The method of claim 16, wherein generating the one or more alternate mode packets based on the USB 3.x packets comprises segmenting the USB 3.x packets into alternate mode packets.

21. The method of claim 16, wherein restoring the USB 3.x packets comprises combining a plurality of the alternate mode packets to restore a segmented USB 3.x packet.

22. The method of claim 16, wherein the alternate mode connection is transparent to the first USB device and the second USB device.

23. The method of claim 16, comprising transmitting a second set of USB 3.x packets from the second USB device to the first USB device via the second interface, the alternate mode connection, and the first interface.

\* \* \* \* \*